May 16, 1950 — H. L. MEKELBURG — 2,507,800
VARIABLE CONTOUR CAM
Filed Sept. 18, 1947

Inventor
Harold L. Mekelburg
By
Attorney

Patented May 16, 1950

2,507,800

UNITED STATES PATENT OFFICE 2,507,800

VARIABLE CONTOUR CAM

Harold L. Mekelburg, Milwaukee, Wis., assignor to Cutler-Hammer, Inc., Milwaukee, Wis., a corporation of Delaware Application September 18, 1947, Serial No. 774,708

4 Claims. (Cl. 74—567)

This invention relates to variable contour cams, particularly advantageous for cam operated circuit controllers.

Cam operated circuit controllers, as for example that shown in the R. B. Hunter Patent No. 2,398,007, issued April 9, 1946, often comprise a series of switches biased to given positions and movable to other positions by cams of varying contour, mounted upon and operable by an oscillatable shaft. Modification of such a controller without change in number of cams might require change in contour of one or more cams whereas modification with increase in number of cams might require of the added cams contours unlike any of those illustrated in the patent. Thus as will be apparent, it would be a great convenience and economy to have for such circuit controllers uniform blanks from which the several cams could be formed with the desired contours and without need of machining the cams individually.

The present invention has among its objects to provide such an article which will enable the desired contour of cam to be obtained by merely removing one or more sections formed for ready removal thereof.

Another object is to provide for the aforementioned and other uses such a variable contour cam formed to receive a non-circular shaft for interlock therewith against relative rotary motion and yet affording contour variation such as to enable the required angular displacement of cam surfaces of the desired cams to be obtained.

Another object is to provide a variable contour cam of reasonable cost.

The accompanying drawings illustrate a preferred embodiment of the invention and an application of the same which will now be described, it being understood that the embodiment shown is susceptible of various modifications without departing from the scope of the appended claims.

Figure 1:
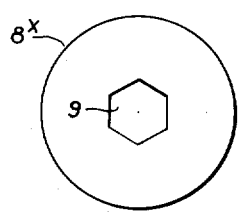
Figure 1 is a plan view of a punched metal blank prior to the stamping and shearing thereof.

Referring to Figure 1, it shows a preferred form of circular metal blank $8^x$ having a polygonal opening 9 formed centrally therethrough from which a universal knockout type of cam element 8 (Fig. 2) is obtained by suitably working the same in a stamping and shearing die. As indicated the blank $8^x$ preferably comprises a single plate.

Figure 2:
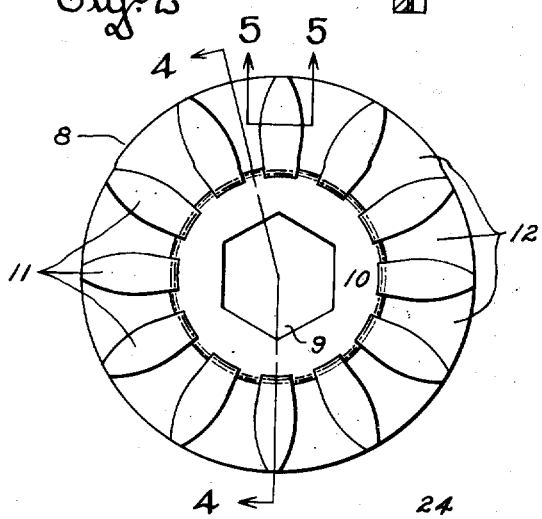
Fig. 2 is a plan view of one face of the blank shown in Fig. 1 after stamping and shearing thereof.

Referring to Fig. 2, it shows a preferred form of a cam element 8 which is obtained after the plate $8^x$ has been suitably worked in a stamping and shearing die. Cam element 8 generally comprises a hub portion 10, a multiplicity of evenly spaced symmetrical segments 11 projecting radially from the hub 10 and a multiplicity of symmetrical segments 12 complementary in form to the segments 11 which project radially from hub 10 between the respective segments 11.

Figure 4:
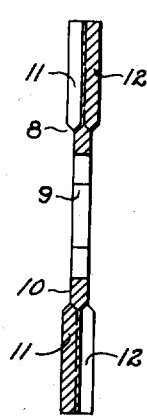
Fig. 4 is a sectional view, on the broken line 4—4 of Fig. 2.
Figure 3:
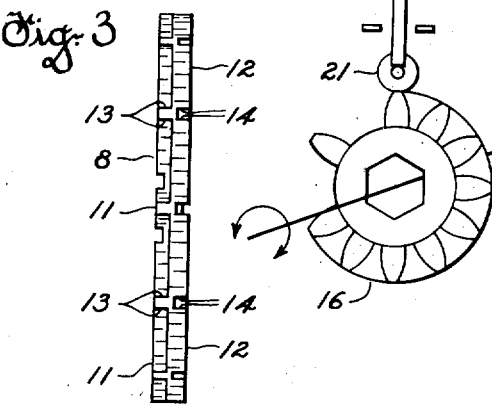
Fig. 3 is an edge view of the blank shown in Fig. 2.

The segments 11 are formed to lie in a common plane parallel with but offset from the plane of the hub 10. The segments 12 likewise lie in a common plane parallel with but offset from the plane of hub 10 and on the opposite side of the latter with respect to the plane of the segments 11 (see Figs. 3 and 4).

Figure 5:
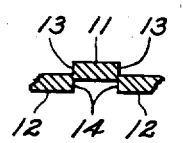
Fig. 5 is a fragmentary sectional view, on the line 5—5 of Fig. 1.

The flanks or sides 13 of each of the segments 11 are, as shown by Fig. 5, sheared away from the adjacent flanks 14 of respective adjacent segments 13. The segments 11 and the segments 12 are integrally connected with the hub 10. The inner root portions of segments 11 angle away from the hub 10 and then readially therefrom at relatively sharp angles. The inner root portions of the segments 12 angle away from the hub 10 oppositely with respect to the segments 11 and then radially from hub 10 at relatively sharp angles. The metal included in the respective angularly extending root portions of the segments 11 and the segments 12 is deformed and reduced in cross section to some extent in the stamping and shearing die.

Figure 6:
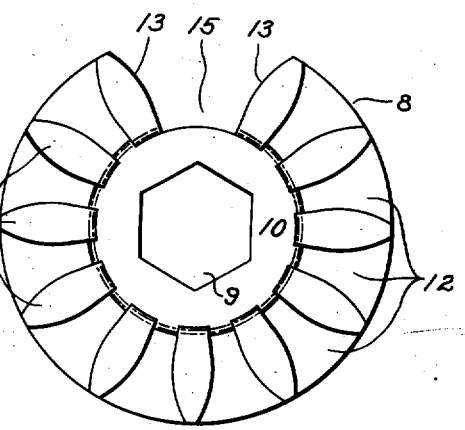
Fig. 6 is a plan view of the finished article constructed in accordance with the invention and having certain segments thereof removed to provide a cam.

Referring to Fig. 6, it shows the cam element 8 with one of the segments 11 and a pair of adjacent segments 12 removed to form a notch 15 in the periphery of the cam. It will be understood that any of the respective segments 11 and the segments 12 may be similarly removed as desired. Segments may be removed by knocking them out or by bending them transversely of hub 10 until they break off; as by the use of a pair of pliers. As will be understood, the facility with which segments may be removed depends upon the type of metal used in constructing the cam element, the completeness of the shearing between the respective segments 11 and 12 along their flank extremities, and the degree of deformation and reduction in cross section of the root portions of the segments obtained in the stamping and shearing die. Steel having a relatively high carbon content has been found to be generally satisfactory for constructing the cam element above described.

Figure 7:
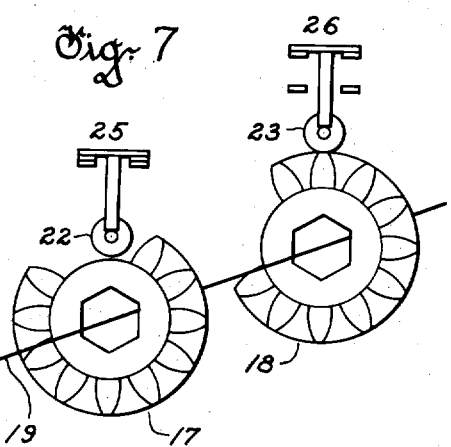
Fig. 7 is a more or less schematic showing of an application of cam elements of the type shown in Fig. 6 in conjunction with electric switches.

Referring to Fig. 7, it shows one application of cams of the aforedescribed type used in conjunction with electric switches. The cams 16, 17 and 18 are assumed to be fixed on a polygonal shaft 19; schematically shown as a line. The cams 16, 17 and 18 are operatively associated, respectively, with roller followers 21, 22 and 23. The roller followers 21, 22 and 23 in turn are connected to actuators of switches 24, 25 and 26 respectively. The latter are schematically shown as comprising stationary contacts which are normally bridged by movable contact members affixed to the ends of the actuators oppositely of their respective roller followers. Each bridging contact member is adapted to be moved upwardly out of engagement with the stationary contacts when its respective roller follower rides on the outer periphery of the cam associated therewith.

It is assumed that the shaft 19 is rotatable in either direction to one or more definite operating positions through the action of a well-known type of star wheel mechanism (not shown).

In the operating position depicted in Fig. 7, the switch 25 is shown as being closed due to the fact that the roller follower 22 engages within a notch formed in the cam 17 by removal of segments 11 and 12. If the shaft 19 is rotated counterclockwise to the next operating position, the roller follower 22 will be moved by cam action, imparted by the radial flank of a segment 11 of cam 17, until it engages with the outer periphery of the latter thereby causing the switch 25 to open. During such movement of shaft 19, roller followers 21 and 23 would continue to ride on the outer peripheries of their respective cams 16 and 18 thereby maintaining the switches 24 and 26 in open condition. Control of the switches upon clockwise rotation of shaft 19 will be apparent and as will be understood the particular showing of Fig. 7 is merely exemplary.

As will be understood by those skilled in the art, the kind and degree of curvature of the flanks 13 of the segments 11 will be determined by the conditions to be met in a particular application of a cam element. A certain curvature and degree of the same is required to afford proper camming action of a cam follower during its movement from a position within a notch to a position on the outer periphery of the element.

While cam elements constructed in accordance with the invention have been shown as applied to electric switches biased to closed position, other applications thereof will be apparent to those skilled in the art.

What I claim as new and desire to secure by Letters Patent is:

1. As an article of manufacture, a one-piece cam element of the knockout type comprising a hub portion and radially extending parts carried by said hub portion and capable of ready removal therefrom individually by breakage of the union therewith, said radially extending parts comprising alternately arranged parts of different contour complementing one another to provide a circular contour of the aggregate of such parts, the contours of alternate parts being suitable for camming upon removal of intermediate complementary parts.

2. As an article of manufacture, a one-piece cam element comprising a substantially flat metal plate of generally circular form having lines of shear extending inwardly toward the center and a line of shear defining for said element a hub portion, said lines of shear first mentioned together with the line of shear last mentioned defining segments of different contours that may be broken off adjacent to the hub portion as desired to obtain various peripheral contours.

3. As an article of manufacture, a one-piece plate cam element of the knockout type comprising a hub, a multiplicity of like segments formed integrally with and projecting radially outwardly from said hub, said segments being formed to lie in a plane parallel with but offset from said hub, and a multiplicity of like segments complementary in form to said first mentioned segments formed integrally with and projecting radially outwardly from said hub between the respective segments first mentioned, said last mentioned segments respectively being substantially disconnected along their flank extremities from respective segments first mentioned, all of said segments being individually adapted to be broken off from said hub as desired to provide various peripheral contours for said element.

4. As an article of manufacture, a one-piece plate cam element of the knockout type formed by the stamping and shearing of a circular metal plate comprising a hub having a polygonal opening extending centrally therethrough, a multiplicity of like evenly spaced symmetrical segments formed integrally with and projecting radially outwardly from said hub, said segments being formed to lie in a plane parallel with but offset from the plane of said hub, and a multiplicity of like symmetrical segments complementary in form to said first mentioned segments formed integrally with and projecting radially outwardly from said hub between the respective segments first mentioned, said last mentioned segments being formed to lie in a plane parallel with but offset from the plane of said hub oppositely of the plane of said first mentioned segments, the structure being such that the respective segments first mentioned are substantially disconnected along their flank extremities from the respective segments last mentioned and all of said segments being individually adapted to be broken off from said hub as desired to provide various peripheral contours for said element.

HAROLD L. MEKELBURG.

REFERENCES CITED

The following references are of record in the file of this patent:

UNITED STATES PATENTS

| Number | Name | Date |
| --- | --- | --- |
| 11,585 | Bazin | Aug. 22, 1854 |
| 398,623 | Keeton | Feb. 26, 1889 |
| 497,835 | Swift | May 23, 1893 |
| 959,475 | Davis | May 31, 1910 |
| 1,504,274 | Schneider | Aug. 12, 1924 |
| 1,613,178 | Litchfield | Jan. 4, 1927 |
| 1,780,328 | Ames | Nov. 4, 1930 |
| 1,853,714 | Allen | Apr. 12, 1932 |
| 2,236,297 | Reid | Mar. 15, 1941 |
| 2,333,248 | Harvey | Nov. 2, 1943 |